(12) United States Patent
Scheel

(10) Patent No.: US 11,883,694 B2
(45) Date of Patent: Jan. 30, 2024

(54) PHASE DILUTION DEMAND OXYGEN REGULATOR (PDDOR) SYSTEM FOR PERSONAL BREATHING

(71) Applicant: B/E Aerospace Systems GmbH, Schleswig-Holstein (DE)

(72) Inventor: Jan-Hinnerk Scheel, Tensfeld (DE)

(73) Assignee: B/E Aerospace Systems GmbH, Schleswig-Holstein (DE)

( * ) Notice: Subject to any disclaimer, the term of this patent is extended or adjusted under 35 U.S.C. 154(b) by 566 days.

(21) Appl. No.: 17/075,168

(22) Filed: Oct. 20, 2020

(65) Prior Publication Data
US 2022/0072341 A1 Mar. 10, 2022

(30) Foreign Application Priority Data
Sep. 7, 2020 (EP) .................................. 20194882

(51) Int. Cl.
*A62B 7/14* (2006.01)
*A62B 7/02* (2006.01)
*A62B 7/12* (2006.01)
*A62B 9/02* (2006.01)
*A62B 18/02* (2006.01)

(52) U.S. Cl.
CPC ............... *A62B 7/14* (2013.01); *A62B 7/02* (2013.01); *A62B 7/12* (2013.01); *A62B 9/027* (2013.01); *A62B 18/02* (2013.01); *A62B 18/025* (2013.01)

(58) Field of Classification Search
CPC .... A62B 7/14; A62B 7/02; A62B 7/12; A62B 9/027; A62B 18/02; A62B 18/025; B64D 2010/005; B64D 10/00
See application file for complete search history.

(56) References Cited

U.S. PATENT DOCUMENTS

| 2,892,456 A | * | 6/1959 | Seeler | A62B 7/04 235/145 R |
|---|---|---|---|---|
| 2,934,293 A | | 4/1960 | Boehme et al. | |

(Continued)

FOREIGN PATENT DOCUMENTS

WO 2008138930 A3 12/2008

OTHER PUBLICATIONS

Extended Search Report for European Application No. 20194882.5 dated Feb. 8, 2021, 10 pages.

(Continued)

*Primary Examiner* — Tu A Vo
(74) *Attorney, Agent, or Firm* — Suiter Swantz pc llo

(57) ABSTRACT

A personal breathing system incorporating a phased-dilution demand oxygen regulator (PDDOR) includes a pressurized oxygen source and oronasal mask, a dilution valve for supplying ambient air and a demand valve for supplying pure oxygen. The PDDOR senses the mask pressure associated with the start of an inhalation cycle, maintaining pressure to the demand valve through an initial demand phase during which 100% pure oxygen is supplied through the demand valve. Control pressure within the PDDOR drops throughout the initial demand phase; when the pressure drops below a lower threshold the PDDOR main valve is closed, blocking the demand valve and cutting off the oxygen supply. Ambient air is provided to the mask via a dilution valve to preserve flow to the user.

13 Claims, 6 Drawing Sheets

(56) References Cited

U.S. PATENT DOCUMENTS

| | | | | |
|---|---|---|---|---|
| 3,037,502 A | * | 6/1962 | Gibbens | A62B 7/14 137/505.46 |
| 3,249,107 A | * | 5/1966 | Delest | A62B 9/025 128/204.28 |
| 3,358,680 A | * | 12/1967 | Chabanier | A62B 7/00 128/205.18 |
| 3,375,839 A | * | 4/1968 | Crenshaw | B64D 13/02 137/115.06 |
| 3,526,239 A | | 9/1970 | Oroza | |
| 4,336,590 A | * | 6/1982 | Jacq | B64D 10/00 128/204.22 |
| 4,648,397 A | | 3/1987 | Beale | |
| 4,909,247 A | | 3/1990 | Terrisse et al. | |
| 5,645,055 A | * | 7/1997 | Danon | A62B 7/14 128/205.24 |
| 6,789,539 B2 | | 9/2004 | Martinez | |
| 6,913,016 B2 | | 7/2005 | Pietrantoni | |
| 2003/0000001 A1 | * | 1/2003 | McDonald | A62B 18/084 2/6.3 |
| 2003/0101997 A1 | * | 6/2003 | Farin | A62B 7/14 128/205.25 |
| 2006/0118115 A1 | * | 6/2006 | Cannon | A62B 7/04 128/204.26 |
| 2010/0139658 A1 | * | 6/2010 | Wenzel | A62B 7/14 128/204.22 |
| 2010/0258127 A1 | * | 10/2010 | Hk | A62B 9/022 128/205.24 |
| 2011/0011403 A1 | | 1/2011 | Hannah et al. | |
| 2013/0327330 A1 | | 12/2013 | Fromage | |

OTHER PUBLICATIONS

Hamilton, R. M., "Performance characteristics of a demand type phase dilution system", Crew Equipment Systems Conference, 1973, URL: https://arc.aiaa.org/doi/pdfplus/10.2514/6, 1973-1346.

\* cited by examiner

PHASE DILUTION DEMAND OXYGEN REGULATOR (PDDOR) SYSTEM FOR PERSONAL BREATHING

TECHNICAL FIELD

The subject matter disclosed herein relates to an assembly for providing oxygen through a breathing mask to a user.

CROSS-REFERENCE TO RELATED APPLICATIONS

The instant application claims priority under 35 U.S.C § 119 to European patent application EP20194882 entitled PHASE DILUTION DEMAND OXYGEN REGULATOR (PDDOR) SYSTEM FOR PERSONAL BREATHING, filed Sep. 7, 2020. Said patent application EP20194882 is herein incorporated by reference in its entirety.

BACKGROUND ART

Human breathing involves a large variety of inhalation profiles that a supplemental oxygen system for altitude breathing needs to support. Supplemental oxygen delivery systems for assisted breathing at altitude must be able to support a broad variety of human breathing scenarios and inhalation profiles. For example, inhalation may vary among individuals, whether the individual is speaking, or due to changes in physical workload (or due to other like stressors).

Supplemental oxygen may be conserved via the use of a phased-dilution system, which provides oxygen at the start of an inhalation cycle. Phased dilution may be normally realized by a combination of a "breathing bag" and a dilution valve (e.g., TSO C64 mask). The amount of added oxygen can be reduced by up to 60% in comparison to the AIR825 minimum concentration requirements (provided in continuous dilution mode), as basically the oxygen provided at the beginning of the inhalation cycle gets inhaled deeper into the lungs and chances of exchange into the blood increase. As a result, added oxygen may be significantly reduced compared to a continuous demand dilution system (which provides oxygen throughout the inhalation cycle).

A similar concept to phased dilution is the application of an oxygen pulse at the beginning of the inhalation. However, pulse-dilution systems are associated with a fixed pulse bolus volume and therefore cannot adapt to variations in workload. Accordingly, the pulse-dilution system must be sized based on maximum workload at maximum intended operational altitude. When the user is at rest or the workload level is low, too much oxygen may be provided. Similarly, at high workload levels and high inhalation peak flows, pulse-dilution systems may fail to cover the full inhalation flow, resulting in dilution in the early phase of the inhalation cycle.

SUMMARY

A breathing system incorporating a phased-dilution demand oxygen regulator (PDDOR; e.g., breathing regulator, cutoff device) is disclosed. In embodiments, the breathing system includes a pressurized oxygen source and a breathing mask worn by a user, the breathing mask connected to the oxygen supply via the PDDOR and covering at least the nose and mouth of the user. The PDDOR is connected to a dilution valve for supplying ambient air and a demand valve connected to the supply line, the demand valve controlling the oxygen supply into the supply line. The PDDOR maintains an interior control volume (CV) pressure. When the user begins to inhale through the breathing mask, commencing an inhalation cycle, the negative pressure signals the PDDOR and opens the demand valve. The PDDOR maintains sufficient CV pressure to keep the demand valve open and provide a pure oxygen supply to the breathing mask during an initial phase of the inhalation cycle as the CV pressure drops within. When the CV pressure drops below a lower threshold pressure, the main valve closes, cutting off the pure oxygen supply via the demand valve (and ending the initial demand phase). When the oxygen supply is cut off, the dilution valve unblocks to provide ambient air to the breathing mask.

In some embodiments, the PDDOR includes a pilot valve and one or more membranes configured for reducing the CV pressure by opening the pilot valve.

In some embodiments, the one or more membranes restore the interior CV pressure by closing the pilot valve at the conclusion of the inhalation cycle.

In some embodiments, the one or more membranes include a sensing membrane for receiving the pressure signal from the breathing mask.

In some embodiments, the one or more membranes include a pull membrane configured for closing the main valve.

In some embodiments, the pull membrane closes the main valve in conjunction with a main valve spring.

In some embodiments, the duration of the initial demand phase of the inhalation cycle varies according to the current air pressure and temperature.

In some embodiments, the breathing mask is an oronasal mask.

In some embodiments, the breathing mask is a full-face mask.

A method for regulating oxygen delivery to a user is also disclosed. In embodiments, the method includes receiving, via a breathing regulator, a pressure signal from a breathing mask, the pressure signal corresponding to the beginning of an inhalation cycle and the opening of a demand valve. The method includes providing a pure oxygen supply to the breathing mask via the open demand valve. The method includes reducing an interior control volume (CV) pressure within the breathing regulator. The method includes, when the CV pressure drops below a lower pressure threshold, cutting off the pure oxygen supply by closing a main valve within the breathing regulator. The method includes providing an ambient air supply to the breathing mask via a dilution valve when the oxygen supply is cut off.

In some embodiments, reducing the CV pressure includes opening a pilot valve of the breathing regulator.

In some embodiments, the method includes, when the inhalation cycle has concluded, restoring the CV pressure within the breathing regulator. The method includes, when the CV pressure exceeds an upper pressure threshold, preparing for the next inhalation cycle by opening the main valve.

In some embodiments, restoring the CV pressure includes closing the pilot valve and preparing for the next inhalation cycle by opening the main valve includes blocking the dilution valve via the main valve.

In some embodiments, the method includes providing the pure oxygen supply throughout an initial demand phase of the inhalation cycle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
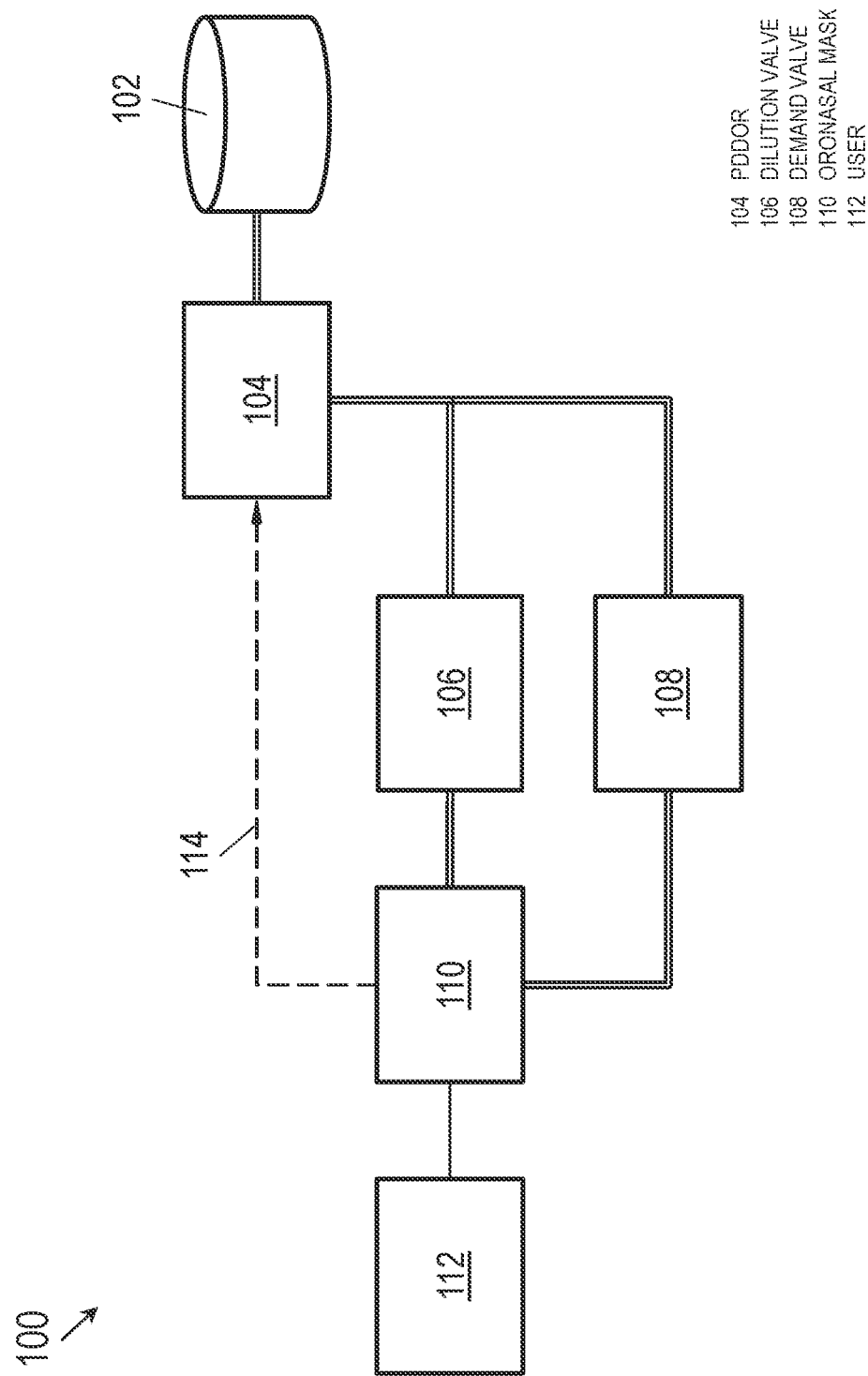
FIG. 1 is a block diagram illustrating a breathing system incorporating a phase-dilution demand oxygen regulator (PDDOR) according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a breathing system incorporating a phased-dilution demand oxygen regulator (PDDOR) is disclosed. The PDDOR allows for a significant reduction in complexity compared to standard pulse oxygen systems and provides better breathing coverage overall while conserving oxygen compared to demand dilution systems. Further, the PDDOR adapts to variations in workload as well as changes in altitude.

Referring now to FIG. 1, a breathing system 100 is disclosed. In embodiments, the breathing system may be utilized by, e.g., parachutists or by aircraft pilots and crew working in high-altitude environments. The breathing system 100 may include a pressurized oxygen source 102 (e.g., oxygen cylinder), PDDOR 104 (e.g., breathing regulator, cutoff device), dilution valve 106, demand valve 108, and oronasal mask 110 worn by a user 112.

In some embodiments, the breathing system 100 may be a conventional pulse system retrofitted with the PDDOR 104.

In embodiments, the oronasal mask 110 may include a mask that covers just the nose and mouth of the user 112 (e.g., used in conjunction with goggles) or a full-face mask, as long as the user's nose and mouth are covered. For example, the PDDOR 104 may be connected to the oronasal mask 110 by a sensor line 114, such that an inhalation by the user 112 may be detected by the PDDOR via the sensor line, e.g., as a negative differential pressure.

In embodiments, the dilution valve 106 provides ambient air to the user 112 through the oronasal mask 110 when in an open (e.g., unblocked) state. Similarly, the demand valve 108 is connected to the oxygen source 102 via the PDDOR 104, supplying 100% pure oxygen to the user 112 through the oronasal mask 110 when in an open state.

In embodiments, the breathing system 100 differs from and improves upon conventional pulse or demand systems by providing 100% pure supplemental oxygen to the user 112 during an initial demand phase of each inhalation cycle, in precise alignment with the inhalation flow. For example, the PDDOR 104 may detect the start of an inhalation cycle via the sensor line 114. The initial demand phase starts with the inhalation cycle, when the demand valve 108 is opened by inhalation pressure; pure oxygen may flow from the oxygen source 102 through the PDDOR 104 and the open demand valve 108 into the oronasal mask 110 as pressure decreases within the PDDOR.

In embodiments, while the control volume (CV) pressure drops within the PDDOR 104, the PDDOR may maintain sufficient CV pressure to keep the demand valve 108 open throughout the initial demand phase. For example, when the control volume (CV) pressure drops to a sufficiently low level, the initial demand phase may conclude. The demand valve 108 may close, cutting off flow from the oxygen source 102 (e.g., except for any oxygen remaining within the PDDOR 104). Concurrently (e.g., or slightly before, to preserve flow to the oronasal mask 110, the dilution valve 106 may unblock or open to permit the flow of ambient air to the oronasal mask 110. At the end of the inhalation cycle, pressure within the PDDOR 104 may rise in preparation for the next inhalation cycle.

Figure 2A:
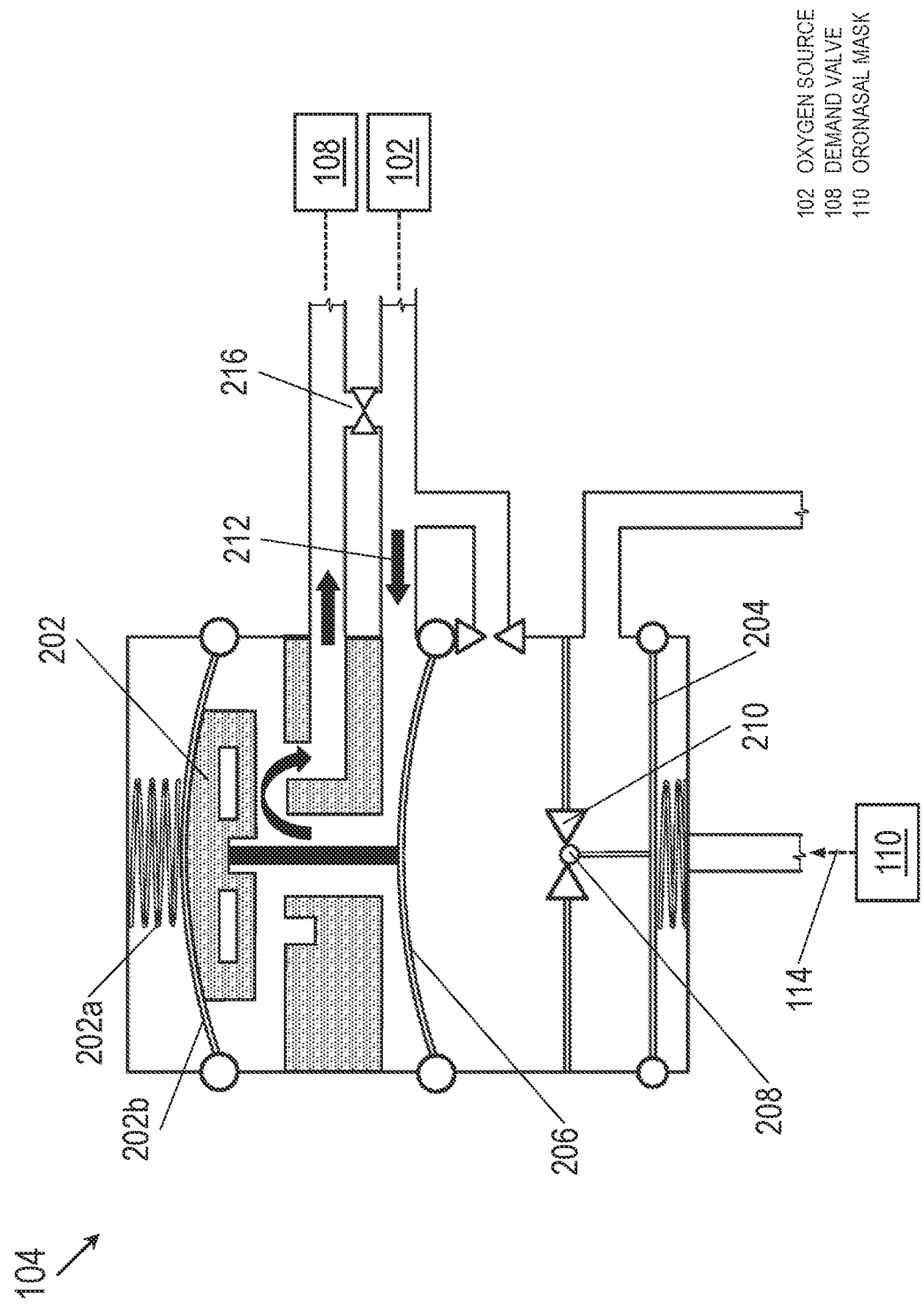
FIG. 2A is a diagrammatic illustration of the PDDOR of FIG. 1 at the start of an inhalation cycle.

Referring to FIG. 2A, the PDDOR 104 is shown in a standby mode prior to the start of an inhalation cycle. The PDDOR 104 may include a main valve 202 (e.g., including supply membrane 202a (e.g., main membrane) and main valve spring 202b), sensing membrane 204, pull membrane 206, and pilot valve 208 set into a decay orifice 210.

In embodiments, the main valve 202 may begin an inhalation cycle in an open state, while the sensing membrane 204 may be in a closed state. Inhalation flow on the part of the user (112, FIG. 1) may result in a negative differential pressure within the oronasal mask 110 (which also opens the demand valve 108). The negative differential pressure may be detected on the sensor line 114 as a pressure signal which triggers a process within the PDDOR 104 that closes off the oxygen supply pressure 212 from the oxygen source 102 (e.g., through the open demand valve 108) after an initial demand phase concludes (e.g., ~500 ms after the commencement of the inhalation cycle; as noted below, the precise duration of the initial demand phase may vary according to temperature and pressure conditions). The pressure signal corresponding to the negative pressure differential may be detected by the sensing membrane 204, which opens the pilot valve 208; consequently, CV pressure within the PDDOR 104 may begin to drop from the peak (e.g., 90-100%) shown by FIG. 2A while the dilution valve (106, FIG. 1) remains blocked. However, as noted above, the PDDOR 104 may maintain sufficient CV pressure that the demand valve 108 remains open throughout the initial demand phase, providing a full oxygen supply from the oxygen source 102. In some embodiments, the drop in CV pressure within the PDDOR 104 may be triggered by non-mechanical means other than the pilot valve 208, e.g., electronic or electromagnetic controls.

Figure 2B:
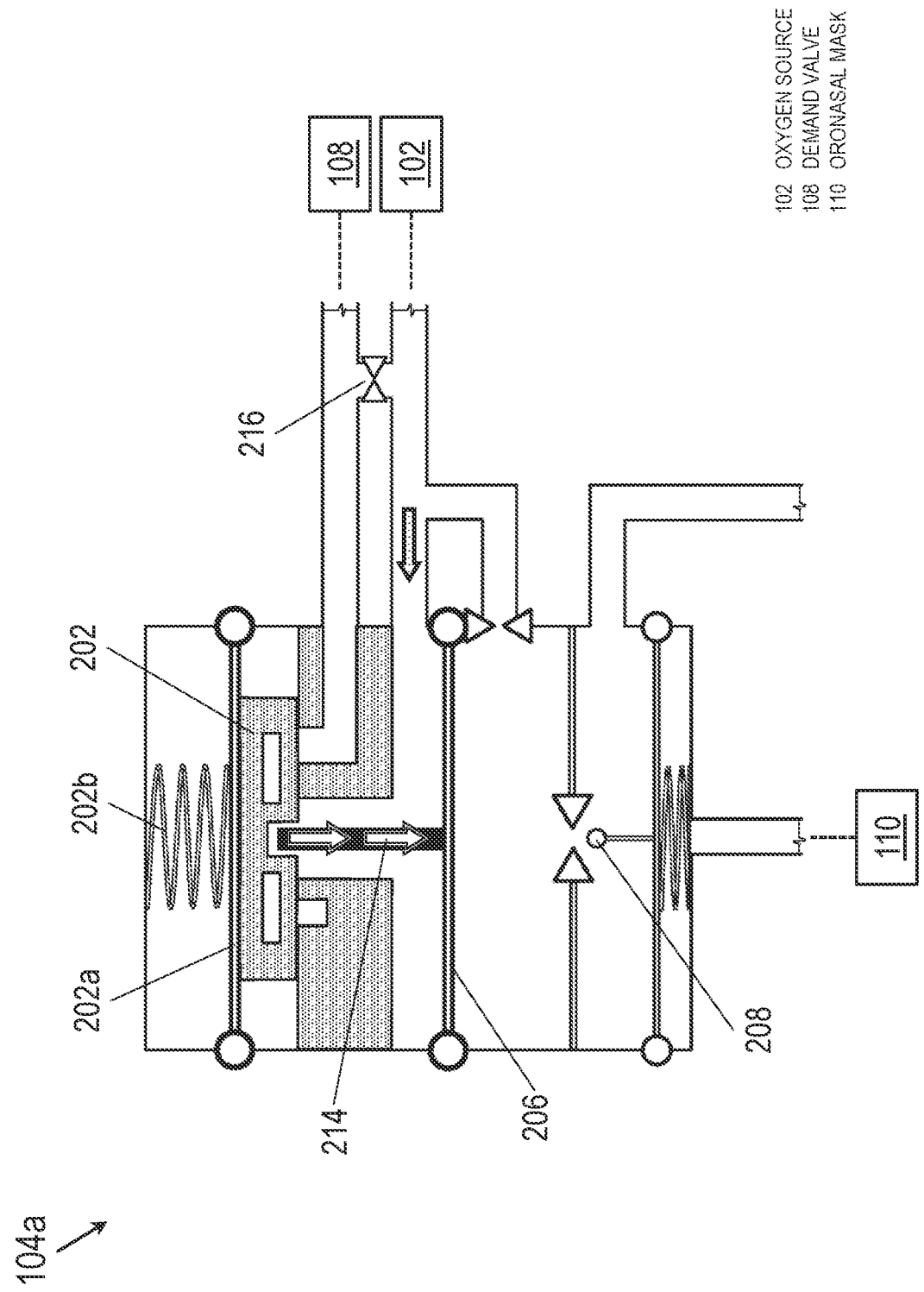
FIG. 2B is a diagrammatic illustration of the PDDOR of FIG. 1 during the inhalation cycle.

Referring also to FIG. 2B, the PDDOR 104a may be implemented and may function similarly to the PDDOR 104 of FIG. 2A, except that within the PDDOR 104a (e.g., 300-500 ms after the start of the inhalation cycle) CV pressure may continue to fall (e.g., to around 25%, or a closing pressure at 1 barg vs. an initial pressure at 4 barg), causing the pull membrane 206 to pull the supply membrane 202a from its open position (214) and closing the supply membrane 202a via hysteresis (assisted by the main valve spring 202b) cutting off the flow from the oxygen source 102 to the demand valve 108 as the pilot valve 208 remains open.

In embodiments, any remaining oxygen under pressure within the PDDOR 104a may be inhaled by the user 112. For example, concurrently with, or just before, the CV pressure within the PDDOR 104a deceeds (e.g., drops below) a lower threshold level, the dilution valve 106 may unblock, allowing ambient air to take over the inhalation flow supply (in addition to any leak flow through the still-open pilot valve 208) and maintaining a continuous uninterrupted flow (e.g., oxygen/oxygen+ambient air/ambient air) to the user 112 through the oronasal mask 110. For example, the dilution valve 106 may be associated with a maximum opening pressure just below the minimum supply pressure of the demand valve 108. Accordingly, the dilution valve 106 may unblock just before the closing of the demand valve 108. In embodiments, the maximum opening pressure of the dilution valve 106 and the minimum supply pressure of the demand valve 108 may be configured to minimize the period of overlap between the opening of the dilution valve and the closing of the demand valve. In some embodiments, the PDDOR 104, 104a may include a bypass valve 216 allowing manual switching (e.g., by the user 112) between full-oxygen and dilution (e.g., ambient air) modes.

In embodiments, the pilot valve 208 may close at the end of the inhalation cycle, causing CV pressure within the PDDOR 104a to rise. When the CV pressure exceeds an upper threshold level, the main valve 202 may reopen (as shown by FIG. 2A) in preparation for the next inhalation cycle.

In some embodiments, the PDDOR 104, 104a may further include mechanical or electronic means (e.g., motor-driven, altitude-dependent/barometric) of presetting or controlling the cutoff time and thus the duration of the initial demand phase.

Figure 3:
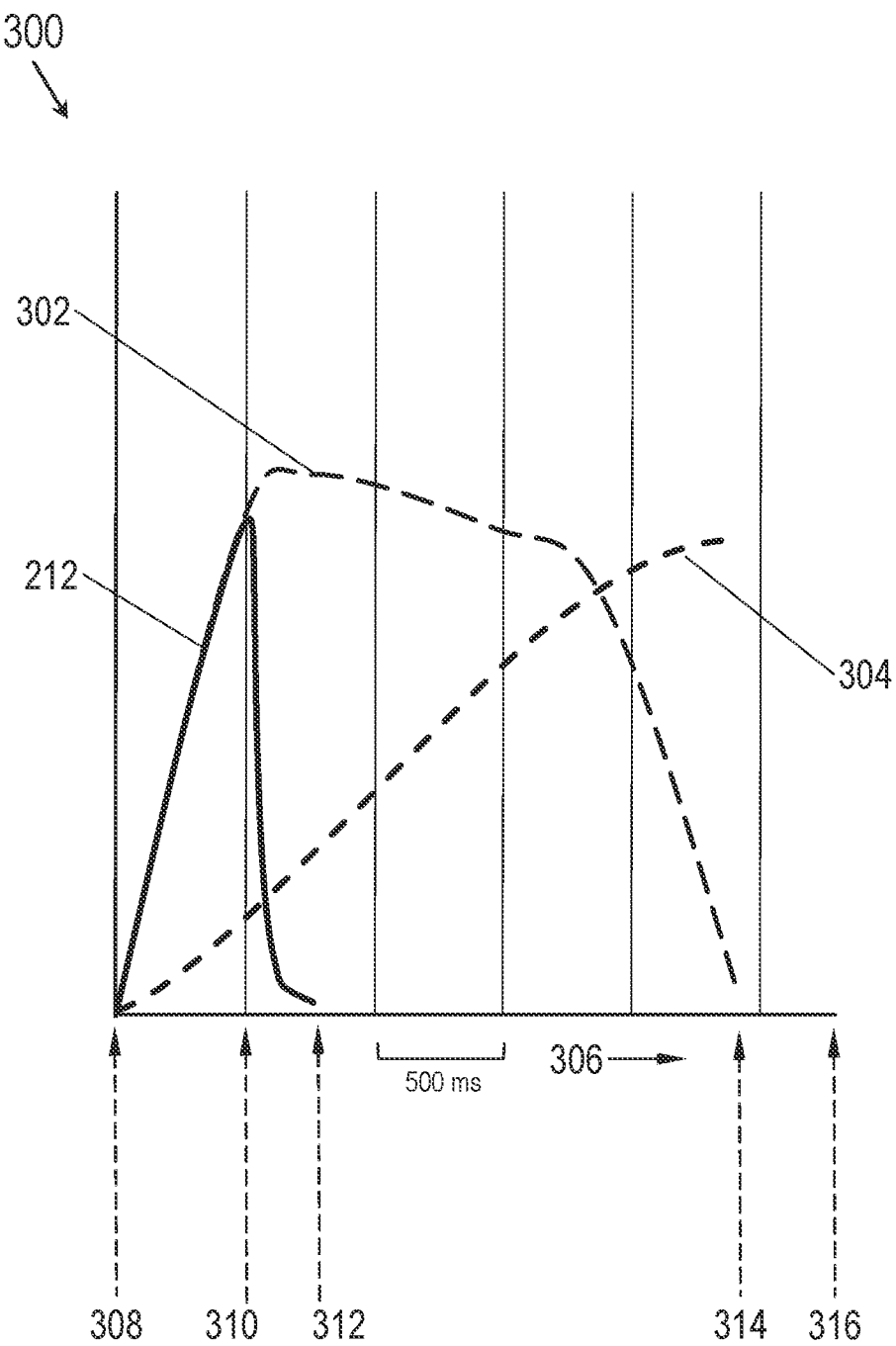
FIG. 3 is a graph of oxygen and inspiration flow through the breathing system of FIG. 1 throughout the inhalation cycle.

Referring to FIG. 3, the graph 300 may plot inhalation flow (302; e.g., in liters per minute) and inspiration volume (304; e.g., in liters) over time (306; e.g., in seconds).

In embodiments, the start of an inhalation cycle (308) at time zero results in a pressure signal received within the PDDOR (104, FIG. 2A; e.g., by the sensing membrane (204, FIG. 2A)), causing the demand valve (108, FIG. 1) to open and CV pressure within the PDDOR to drop (e.g., from its approximate peak; e.g., due to the opening of the pilot valve (208, FIG. 2A)). For example, the flow of oxygen 212 from the oxygen source (102, FIG. 2A) to the oronasal mask (110, FIG. 1) may track substantially with the inhalation flow 302 during an initial demand phase which concludes when the CV pressure within the PDDOR 104 drops below a lower threshold pressure.

In embodiments, around 500 ms after the start of the inhalation cycle, the CV pressure drops sufficiently (e.g., around 50%) to close the main valve (202, FIG. 2A), and thereby blocking the demand valve 108 (310), concluding the initial demand phase and cutting off the flow of oxygen 212 (e.g., from the oxygen source (102, FIG. 2B)). The closing of the demand valve 108 may occur immediately after, or concurrently with, the unblocking of the dilution valve (106, FIG. 2B). For example, the flow of oxygen 212 may trail off as any remaining oxygen within the PDDOR (104a, FIG. 2B) is inhaled by the user (112, FIG. 1), e.g., along with ambient air provided through the dilution valve 106. When the remaining oxygen is inhaled (312; e.g., ~600 ms after the start of the inhalation cycle), the airflow into the oronasal mask 110 may consist of ambient air only, plus any leak flow through the still-open pilot valve (208, FIG. 2B).

In embodiments, the inhalation cycle may conclude with the closing (314) of the pilot valve 208 (e.g., ~2.5 seconds after the start of the inhalation cycle). For example, inhalation flow 302 may drop to zero, closing the pilot valve 208 and restoring CV pressure within the PDDOR 104a.

In embodiments, after the pilot valve 208 closes (e.g., ~400 ms after the conclusion (314) of the inhalation cycle), CV pressure within the PDDOR 104 has risen to a sufficiently high level (e.g., around 90%) to exceed the upper threshold pressure and reopen (316) the main valve 202 in preparation for the next inhalation cycle. It should be noted that the timing and/or duration of the initial demand phase may be pressure-driven and thus may vary with altitude and temperature, as described in more detail below.

Figure 4A:
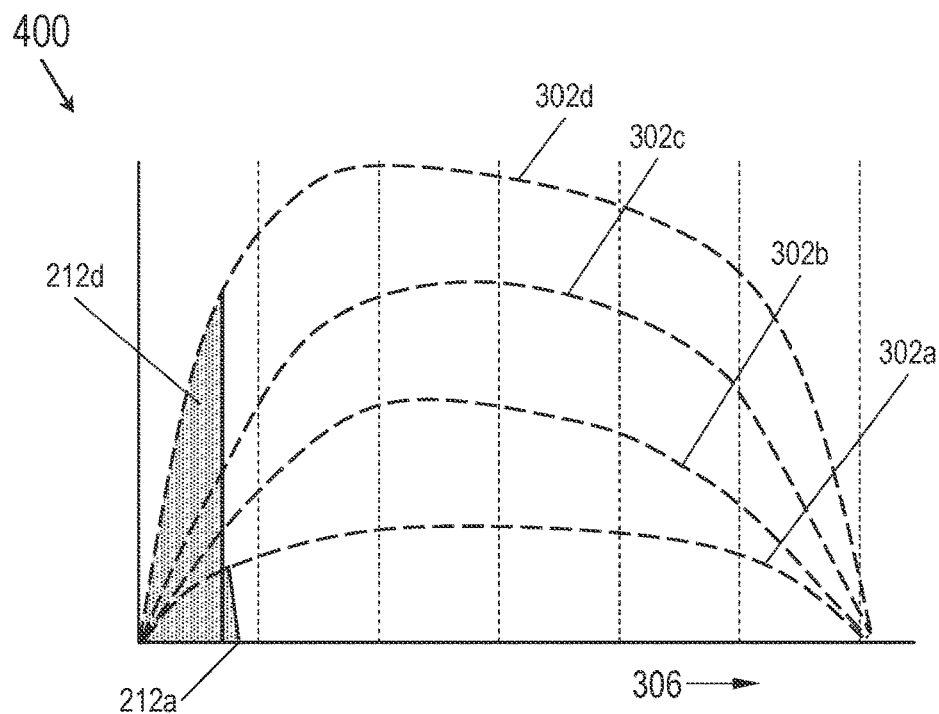
FIG. 4A is a graph of oxygen and inhalation flow over time through the breathing system of FIG. 1 under varying workload conditions.

Referring to FIG. 4A, the graph 400 may plot inhalation flow 302a-d over time 306. The inhalation flows 302a-d and flow of oxygen 212a, 212d may be implemented and may function similarly to the inhalation flow 302 and flow of oxygen 212 of FIG. 3, except that the rate of inhalation flow 302a-d may vary according to workload. For example, the rate of inhalation flow 302a may correspond to a nominal workload of 0 W/kg, and the rates of inhalation flow 302b-d to gradually increasing workloads of 0.5 W/kg, 1.0 W/kg, and 1.5 W/kg respectively.

In embodiments, the control times and operations of the PDDOR (104, FIG. 1) may depend on gas density, and therefore may adapt to changes in absolute pressure (e.g., altitude) and air temperature as well as changes in workload. For example, the inhalation flows 302a-d may correspond to a nominal pressure and temperature, e.g., ground level (0 ft AGL) and 15° C. In each case, the flow of oxygen 212a, 212d may substantially track with the inhalation flow 302a-d throughout an initial demand phase, e.g., of ~300 ms after the start of the inhalation cycle. Under these conditions the total oxygen volume dispensed (e.g., tidal volume) may increase as workload increases, while the initial demand phase concludes sooner as workload increases (e.g., 73 ml over 325-360 ms (at the nominal workload, inhalation flow 302a) to 216 ml over 260-275 ms (at the elevated workload of 1.5 W·kg, 302d)).

Figure 4B:
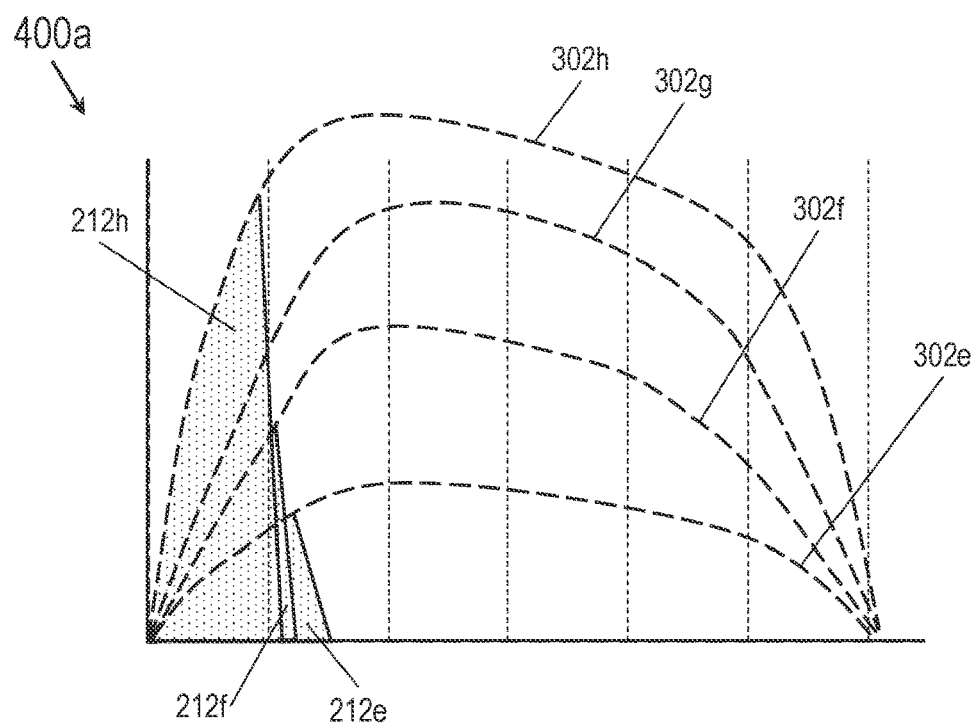
FIG. 4B is a graph of oxygen and inhalation flow over time through the breathing system of FIG. 1 under varying environmental conditions compared to the graph of FIG. 4A.

Referring also to FIG. 4B, the graph 400a and the inhalation flows 302e-h may be implemented and may function similarly to the graph 400 and the inhalation flows 302a-d of FIG. 4A and their respective corresponding workloads, except that the inhalation flows 302e-h may correspond to a higher altitude (e.g., 24,000 ft AGL) and lower air temperature (e.g., −32° C.). While the flow of oxygen 212e-h still tracks with the inhalation flow 302e-h throughout the initial demand phase at the higher altitude (and lower temperature and pressure) while the volume of oxygen dispensed remains relatively consistent with the applicable workload, the main valve (202, FIGS. 2A-B) remains open for a longer duration (e.g., 550-620 ms at the nominal workload (inhalation flow 302e) to 460-480 ms at the elevated workload (inhalation flow 302h)). Because the PDDOR 104 adapts inherently to changes in altitude, the breathing system 100 may be configured for a relatively low basic value for pure oxygen dosing time (e.g., the initial demand phase) and may provide for a potential switch altitude (e.g., from 100% pure oxygen to saving mode) above current levels (e.g., ~22,000 ft).

In embodiments, given the tidal volumes and cutoff times described above, average oxygen concentrations may be slightly above minimum (e.g., as defined by SAE 825 standards for oxygen equipment for aircraft). However, the phased-dilution supply mode of the PDDOR 104 operates more efficiently than would a constant-dilution mode and may achieve efficient blood saturation at comparatively reduced oxygen dosing levels as compared to current systems, which may be retrofitted with the PDDOR 104 for improved performance with reductions in oxygen consumption and system complexity.

Figure 5:
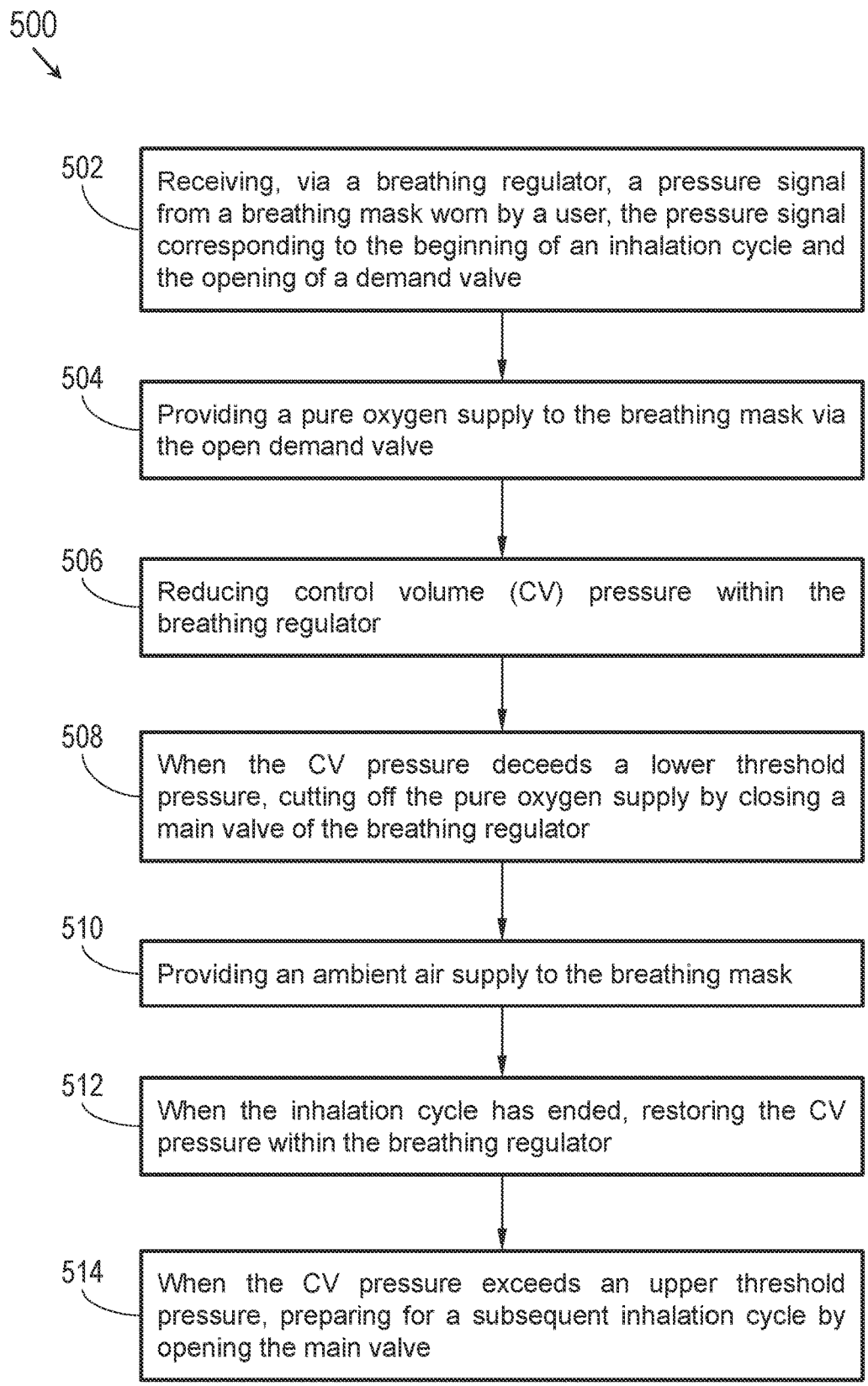
FIG. 5 is a process flow diagram illustrating a method for regulating oxygen delivery to a user according to example embodiments of this disclosure.

Referring to FIG. 5, a method of operation 500 may be implemented via the breathing system 100 (including a breathing regulator, e.g., the PDDOR 104) and may include the following steps.

At a step 502, the breathing regulator receives a negative pressure signal from a breathing mask (e.g., oronasal or full-face) worn by a user, signaling the beginning of an inhalation cycle. For example, the user may inhale through the breathing mask, initiating the negative pressure signal and generating sufficient pressure to open the demand valve coupled to the oxygen supply. The pressure signal may also indicate the beginning of the initial demand phase within the inhalation cycle.

At a step 504, the breathing regulator provides a full oxygen supply to the user through the breathing mask via the open demand valve. For example, the full oxygen supply may be provided throughout the initial demand phase of the inhalation cycle while the demand valve remains open.

At a step 506, the breathing regulator reduces control volume (CV) pressure within the breathing regulator. For example, a pilot valve may open substantially concurrently with the beginning of the inhalation cycle, such that CV pressure gradually drops throughout At a step 508, when the CV pressure is sufficiently reduced to deceed the lower threshold pressure (e.g., 25% of maximum) the pure oxygen supply is cut off by closing a main valve of the breathing regulator. For example, the closing of the main valve may block the flow of pure oxygen to the demand valve.

At a step 510, the breathing regulator provides an ambient air supply (e.g., which may include any residual oxygen remaining in the breathing regulator or in the supply line to the breathing mask) by opening a dilution valve. For example, as the CV pressure approaches the lower threshold pressure where the main valve closes, blocking the demand valve, the dilution valve may open to maintain a continuous uninterrupted flow to the breathing mask.

The method 500 may include additional steps 512 and 514. At the step 512, after the inhalation cycle ends, the breathing regulator restores the CV pressure. For example, the pilot valve may be closed, causing the CV pressure to increase within the breathing regulator) in preparation for the next inhalation cycle.

At the step 514, when the CV pressure is sufficiently restored to exceed an upper threshold pressure, the main valve reopens in anticipation of the next inhalation cycle.

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:
1. A breathing system, comprising:
at least one pressurized oxygen source;

a breathing mask worn by a user and configured to cover a nose and a mouth of the user, the breathing mask coupled to the pressurized oxygen source by at least one supply line;

a dilution valve coupled to the supply line, the dilution valve configured to provide a supply of ambient air to the breathing mask when open;

a demand valve coupled to the at least one oxygen source via the supply line; and a breathing regulator coupled to the at least one supply line and to the at least one oxygen source, the breathing regulator associated with a control volume (CV) pressure within the breathing regulator, and comprising at least one main valve, the breathing regulator configured to:

1) receive at least one pressure signal from the breathing mask, the pressure signal corresponding to a) a start of an inhalation cycle, b) an initial demand phase of the inhalation cycle, and c) an opening of the demand valve;

2) provide a pure oxygen supply from the at least one oxygen source to the breathing mask via the open demand valve throughout the initial demand phase;

3) when the CV pressure deceeds a lower pressure threshold, cutting off the pure oxygen supply by closing the main valve;

4) when the main valve closes, provide the ambient air supply to the breathing mask via the dilution valve, when the inhalation cycle has ended, restoring the CV pressure within the breathing regulator; and 5) when the CV pressure exceeds an upper pressure threshold, preparing for a subsequent inhalation by reopening the main valve.

2. The breathing system of claim 1, wherein the breathing regulator includes:
at least one pilot valve; and
at least one membrane configured to reduce the CV pressure by opening the at least one pilot valve in response to the pressure signal.

3. The breathing system of claim 2, wherein the at least one membrane is configured to restore the CV pressure by closing the at least one pilot valve at a conclusion of the inhalation cycle.

4. The breathing system of claim 2, wherein the at least one membrane includes a sensing membrane configured to receive the pressure signal.

5. The breathing system of claim 2, wherein the at least one membrane includes a pull membrane configured to close the main valve.

6. The breathing system of claim 5, wherein the pull membrane is configured to close the main valve in conjunction with at least one main valve spring.

7. The breathing system of claim 1, wherein a duration of the initial demand phase is dependent upon at least one of an air pressure or an air temperature.

8. The breathing system of claim 1, wherein the breathing mask is an oronasal mask.

9. The breathing system of claim 1, wherein the breathing mask is a full-face mask.

10. A method for regulating oxygen delivery to a user, the method comprising:
receiving, via a breathing regulator, a pressure signal from a breathing mask worn by a user, the pressure signal corresponding to the beginning of an inhalation cycle and the opening of a demand valve;
providing a pure oxygen supply to the breathing mask via the open demand valve;
reducing a control volume (CV) pressure within the breathing regulator;
when the CV pressure deceeds a lower pressure threshold, cutting off the pure oxygen supply by closing a main valve of the breathing regulator;
providing an ambient air supply to the breathing mask;
when the inhalation cycle has ended, restoring the CV pressure within the breathing regulator; and
when the CV pressure exceeds an upper pressure threshold, preparing for a subsequent inhalation cycle by opening the main valve.

11. The method of claim 10, wherein reducing the CV pressure within the breathing regulator includes:
reducing the CV pressure by opening at least one pilot valve of the breathing regulator.

12. The method of claim 10, wherein:
when the inhalation cycle has ended, restoring the CV pressure within the breathing regulator includes restoring the CV pressure by closing at least one pilot valve of the breathing regulator.

13. The method of claim 10, wherein providing the pure oxygen supply to the breathing mask via the open demand valve includes:
providing the pure oxygen supply to the breathing mask throughout an initial demand phase of the inhalation cycle.

* * * * *